US007555305B2

United States Patent
Hsieh et al.

(10) Patent No.: US 7,555,305 B2
(45) Date of Patent: Jun. 30, 2009

(54) METHOD FOR DIRECT LINK IN WIRELESS COMMUNICATION SYSTEM

(75) Inventors: Chih-Chiang Hsieh, Kaohsiung County (TW); Shiann-Tsong Sheu, Taipei (TW); Heng-Iang Hsu, Taipei (TW); Yu-Ting Yao, Tainan (TW)

(73) Assignee: Institute of Information Industry, Taipei (TW)

( * ) Notice: Subject to any disclaimer, the term of this patent is extended or adjusted under 35 U.S.C. 154(b) by 716 days.

(21) Appl. No.: 11/335,626

(22) Filed: Jan. 20, 2006

(65) Prior Publication Data

US 2007/0104214 A1 May 10, 2007

(30) Foreign Application Priority Data

Nov. 4, 2005  (TW) ............................... 94138893 A

(51) Int. Cl.
*H04B 7/00* (2006.01)
(52) U.S. Cl. .................... 455/522; 455/420; 455/456.2; 455/456.1; 370/458; 370/318
(58) Field of Classification Search ........................ None
See application file for complete search history.

(56) References Cited

U.S. PATENT DOCUMENTS

| | | | | |
|---|---|---|---|---|
| 7,079,509 | B2 * | 7/2006 | Belcea | 370/330 |
| 2005/0088980 | A1 * | 4/2005 | Olkkonen et al. | 370/255 |
| 2006/0258383 | A1 * | 11/2006 | Jiang et al. | 455/502 |

* cited by examiner

*Primary Examiner*—Tan Trinh
(74) *Attorney, Agent, or Firm*—Birch, Stewart, Kolasch & Birch, LLP

(57) ABSTRACT

A method for direct link in wireless communication system is provided, which is applied in a base station with functions for broadcast and time division duplex (TDD), the method comprising the following steps: receiving connection request signalings including position information from a plurality of subscriber stations (SSs) with global positioning systems (GPSs); determining the SSs which can carry out the direct link, according to the connection request signalings; allocating time slots to each SS which can carry out direct link in the scheduling; calculating a relative distance between the two SSs according to the position information; determining an initial transmit power for the transmitting SS, and adjusting it many times; finally, adding the adjusted transmit power value and the time slot information allocated to the SSs in the scheduling into the broadcast message.

24 Claims, 6 Drawing Sheets

METHOD FOR DIRECT LINK IN WIRELESS COMMUNICATION SYSTEM

CROSS-REFERENCE TO RELATED APPLICATIONS

This non-provisional application claims priority under 35 U.S.C. § 119(a) on Patent Application No(s). 094138893 filed in Taiwan, R.O.C. on Nov. 4, 2005, the entire contents of which are hereby incorporated by reference.

BACKGROUND OF THE INNENTION

1. Field of the Invention

The present invention relates to a method for direct link in a wireless communication system, and more particularly, to a method for achieving a direct link applied in a central managed wireless communication system with broadcast function.

2. Related Art

Along with the continual progress of communication technology, the manner in which people access networks is gradually evolving from narrow band to broad band, and the manner for internet connection is evolving from wired connections to wireless connections. The IEEE 802.16 wireless transmission manner especially receives the attention of the masses, it can be used to transmit high-speed data, and can further resist multi-path effect, eliminate interference among symbols, resist selective frequency fading, and has a high channel availability, such that network disposition is more convenient and flexible, especially effective in solving the most troublesome last mile problem of network construction.

Referring to FIG. 1, it is a schematic diagram of a conventional transmission manner in the IEEE 802.16 wireless network system. Taking two subscriber stations (SSs) as an example, connection request signalings 140 are first put forward to a base station (BS) 110 by SSs 120, 130; then the BS 110 determines whether or not to accept the connections of the first SS 120 and the second SS 130, according to the present state of the wireless environment.

Once the BS 110 accepts the connections of the first SS 120 and the second SS 130, the decision is added into a broadcast message 160 to inform the two SSs 120, 130, and unique connection IDs (CIDs) are assigned to the first SS 120 and the second SS130 respectively as a reference to distinguish the two different SSs 120, 130. In the IEEE 802.16 system, the BS 110 control all the wireless resource distributions, for distributing the wireless resource to each SS 120, 130 in a manner of time division duplex (TDD), and the BS 110 also may periodically send a broadcast message to the SSs 120, 130, for informing the SSs 120, 130, regarding data transmission 150, of when data can be uploaded and when data must be received.

As shown in FIG. 2a, it is a schematic diagram of a scheduling architecture of a frame 20. According to the IEEE 802.16 system, one or more UpLink burst (UL Burst) time slots in the UpLink SubFrame (UL SubFrame) 210 are required by the SSs 120, 130 to upload data, and one or more DownLink Burst (DL Burst) time slots in the DownLink SubFrame (DL SubFrame) 220 are required by the SSs 120, 130 to receive data. Such a data distribution manner will cause the following situations when a same data is switched between the two SSs 120, 130, as shown in FIG. 2b and 2c: in FIG. 2b, an SS A, and an SS C upload the "A→B data" and "C→D, E data" to the BS 110 in the nth frame respectively, while in FIG. 2c, an SS B, an SS D, and an SS E receive the "A→B data" and "C→D, E data" from the BS 110 in the (n+1)th frame respectively. And in such a manner, one or even multiple UL Burst time slots and one or more DL Burst time slots will be tied up more than normally, and data will appear in repeat in the UL SubFrame 210 and the DL SubFrame 220, thus wasting wireless resources. And the BS 110 should receive and transmit data between the two SSs 120, 130, and its loading is relatively heavy when the transmission is frequent.

SUMMARY OF THE INVENTION

In view of the above problems, an object of the present invention is to provide a method for direct linking in a wireless communication system, by improving the scheduling mechanism of a BS, in which owing to that without changing SS specifications, the BS of the present invention may accept connection requests from more SSs, overall service efficiency of wireless resources can be raised, further reducing the distribution density of BSs, allowing for reduced operating costs.

Therefore, to achieve the above object, a method for direct linking in a wireless communication system is disclosed by the present invention. It is applied in a time division duplex (TDD) BS with broadcast function, and a plurality of SSs is under the control of the BS, wherein each SS has a positioning device for obtaining position information of the SS. The method for achieving the direct link comprises the following steps:

First, the BS may receive connection request signalings issued by a plurality of SSs respectively, wherein each connection request signaling includes position information of the SS.

Then, the BS may determine whether, in each connection request signaling, there is at least one set of a plurality of SSs which can carry out the direct link, i.e. one transmitting SS requesting transmission of a data, and at least one receiving SS requesting reception of such a data.

If the determination is yes, the BS may allocate a plurality of time slots to each set of SSs which can carry out the direct link in the scheduling, to carry out data transmission of the UL Burst and the DL Burst.

Then, the BS may calculate a relative distance between the two according to the position information corresponding to each SS in the set.

Next, after calculation, the BS may determine an initial transmit power of the transmitting SS according to such a relative distance.

And the BS may perform the try and error with the SS many times to confirm. whether data are received normally, and then adjust according to the receiving state, and finally, add an adjusted transmit power for direct link of the transmitting SS and a plurality of time slots for direct link distributed in such a scheduling into a next broadcast message.

The features and practices of the present invention are illustrated by a most preferred embodiment with reference to accompanying drawings as follows.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

A method for direct link in a wireless communication system will be disclosed in the present invention. In the following detailed illustration of the present invention, many particular details will be described to provide an integral description of the present invention. However, those skilled in the art may implement the present invention without using the particular details, or by using alternative elements or methods. In other cases, the known methods, procedures, parts, and circuits are not illustrated in detail to avoid unnecessary confusion regarding the emphases of the present invention.

Figure 1:
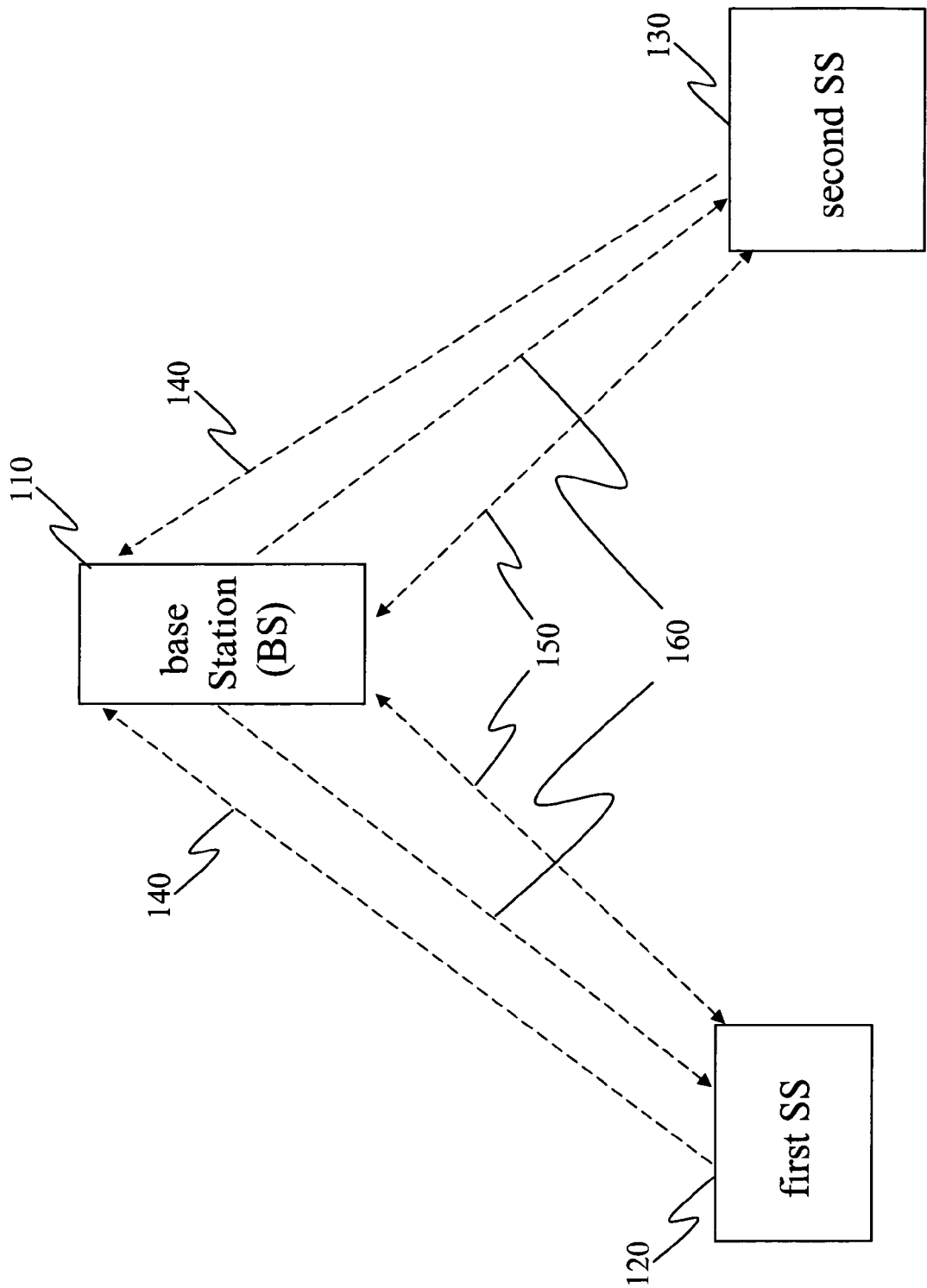
FIG. 1 is a schematic diagram of a conventional transmission manner in the IEEE 802.16.
Figure 3:
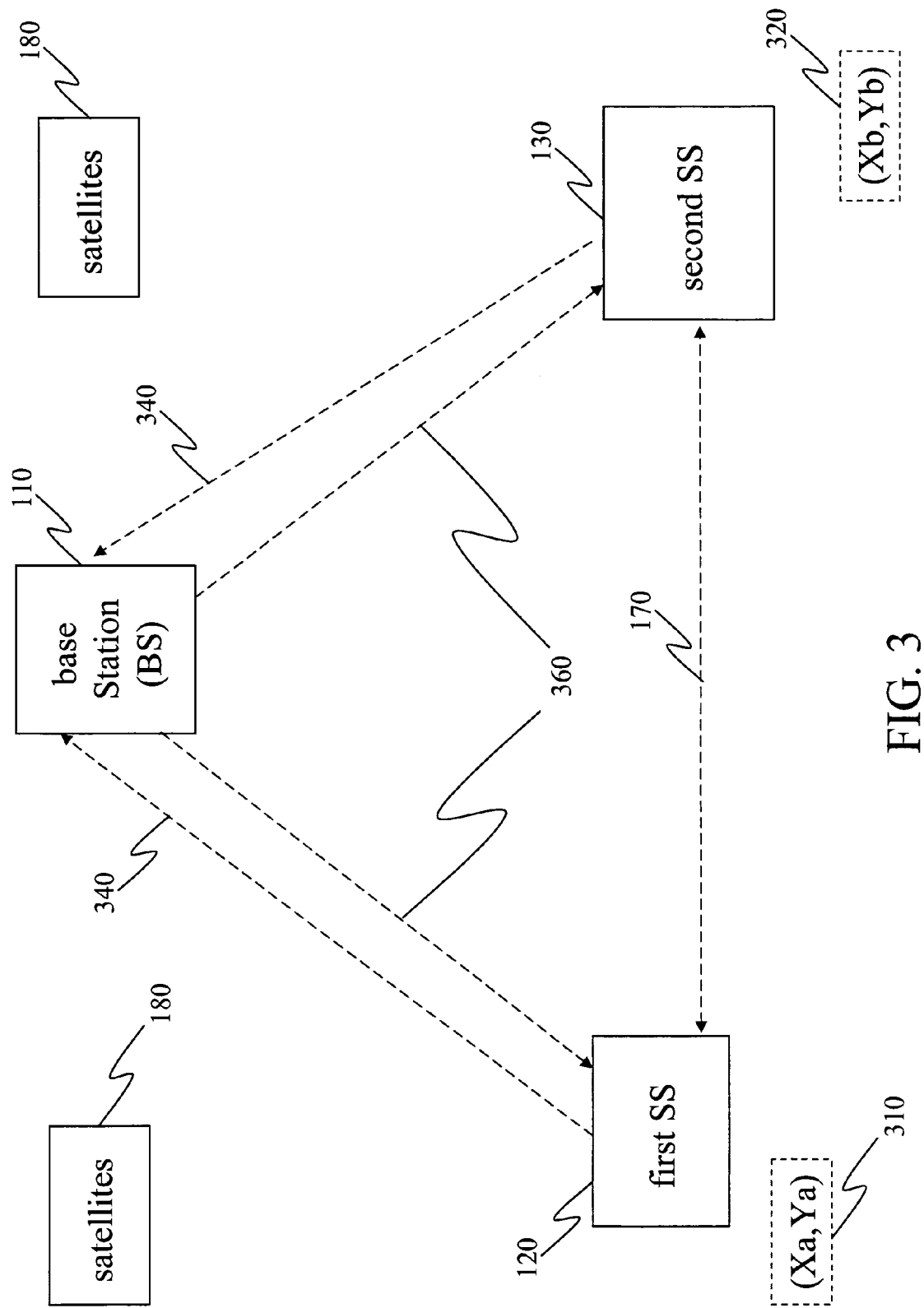
FIG. 3 is a schematic diagram of a transmission manner according to the present invention.

The present invention is to improve the situation of wasting of wireless resources and over loading of the BS 110 caused by the conventional technology. Referring to FIG. 3, it is a schematic diagram of a transmission manner disclosed in the present invention, wherein compared with the FIG. 1 of the conventional manner, the SSs 120, 130 of the present invention have a global positioning systems (GPSs) whose GPS antennas may receive position information 310, 320 from many satellites 180 in space or other positioning devices, for example devices for positioning in a trilateration manner by using the BS signal, positioning according to identifiers on a diagram, or positioning by cellular technology, etc., to obtain the current position of each SS.

Figure 2:
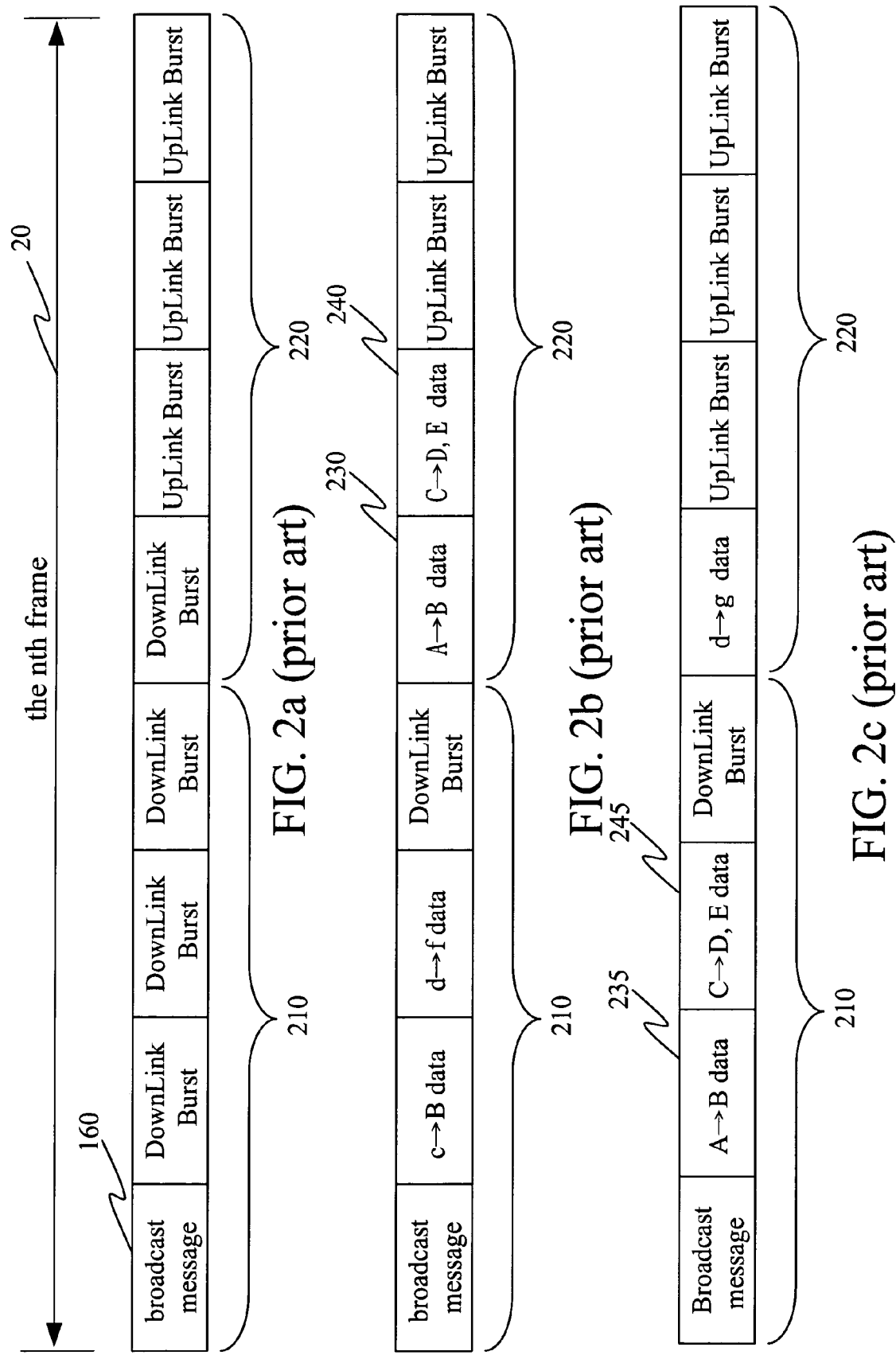
FIG. 2a is a schematic diagram of a scheduling architecture of a conventional frame.
FIG. 2b is a schematic diagram of a scheduling architecture of the conventional frame according to a first embodiment.
FIG. 2c is a schematic diagram of a scheduling architecture of the conventional frame according to a second embodiment.
Figure 4A:
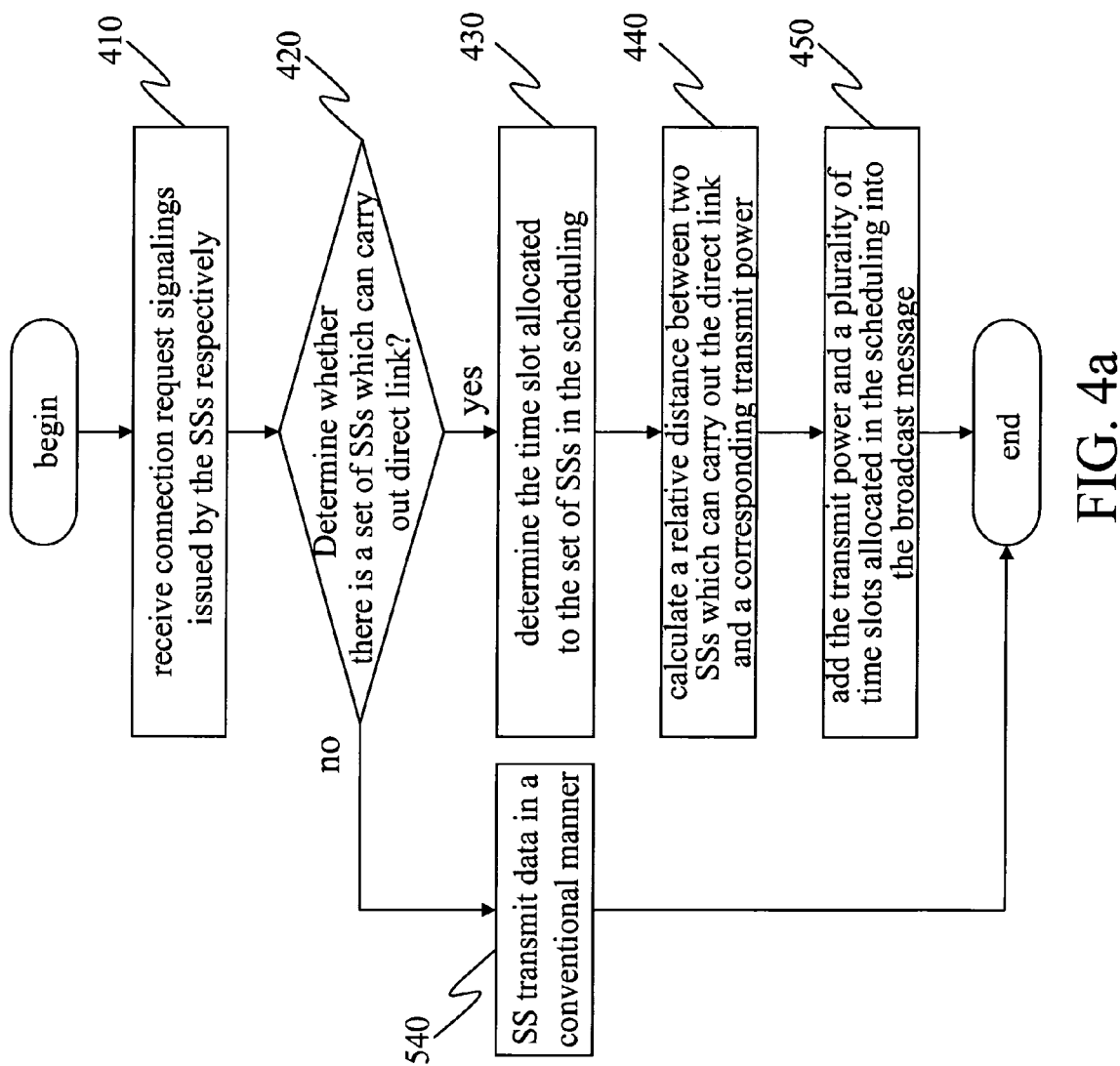
FIG. 4a is a flow chart of the method according to the present invention.

Supposing the position information 310 of the first SS 120 is (Xa,Ya), and the position information 320 of the second SS 130 is (Xb,Yb). Referring to FIG. 4a, it is a flow chart of the method disclosed by the present invention. When the SSs 120, 130 put forward a connection request signaling 340 to the BS1 10, its individual position information 310, 320 may be added into the connection request signaling 340 (Step 410). The BS 110 may know which SSs 120, 130 need to carry out the UL Burst time slot and the DL Burst time slot from the connection ID (CID) after receiving these connection request signalings 340, wherein the connection request signaling 340 put forward by the SS of the UL Burst, supposed to be the first SS 120, comprises the CID regarding to which SS to transmit data. For example, in FIG. 2b of the conventional art, "A→B data" is the UL Burst 230 put forward by the SS A, while "A→B data" in FIG. 2c is a DL Burst 235 put forward by the SS B, and similarly, "C→D, E data" in FIG. 2b is a UL Burst 240 put forward by the SS C, while "C→D, E data" in FIG. 2c is a DL Burst 245 put forward by the SS D and the SS E.

According to these information of transmitting data, the BS 110 may determine that the SS A and the SS B lare of a set of SSs 120, 130 which can carry out the direct link 170 (Step 420), while the SS C and the SSs D, E together are also a set. However, on the scheduling mechanism of the TDD, two frames 20 must be used, wherein in the first frame 20, the BS 110 is used to receive the data uploaded by the SS of the UL Burst, and the uploaded data are not transmitted to the SS of the DL Burst until the second frame 20 has been reached, such is the heart of the conventional problem.

Figure 5A:
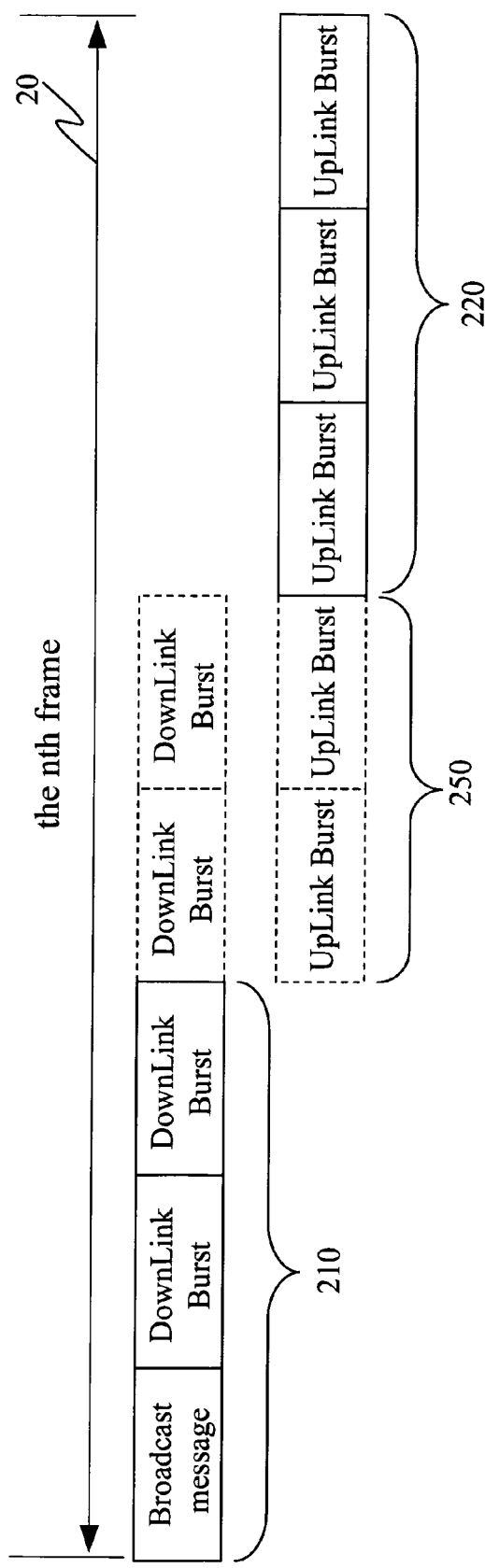
FIG. 5a is a schematic diagram of a scheduling architecture of a frame disclosed in the present invention.

Therefore, the present invention is to solve such a problem. Referring to FIG. 5a, it is a schematic diagram of a scheduling architecture of the frame 20 disclosed in the present invention. Similarly, compared with FIG. 2a of the conventional manner, the scheduling mechanism of the present invention further comprises an intersected DirectLink SubFrame 250, besides the previous sub-frame of the broadcast message 160, a UL SubFrame 210 and a DL SubFrame 220, wherein each sub-frame is cut equally into a plurality of time slots, and the cutting number depends on the number of SSs requesting data transmission, and each time slot in the DirectLink SubFrame 250 is allocated to each set of SSs 120, 130 which can carry out the direct link 170 (Step 430), wherein each set includes a transmitting SS and at least one receiving SS.

Each SS will add individual position information 310, 320 to a connection request signaling 340 when putting forward it. Therefore, the BS 110 can calculate a relative distance between the two SSs 120, 130 which can carry out the direct link 170, and calculates an initial transmit power required for transmitting data by a transmitting SS corresponding to such a relative distance. If more than one receiving SS receive the same data, the transmitting SS of the data may transmit by an initial transmit power corresponding to the one with the longest distance among the receiving SSs (Step 440).

Figure 5B:
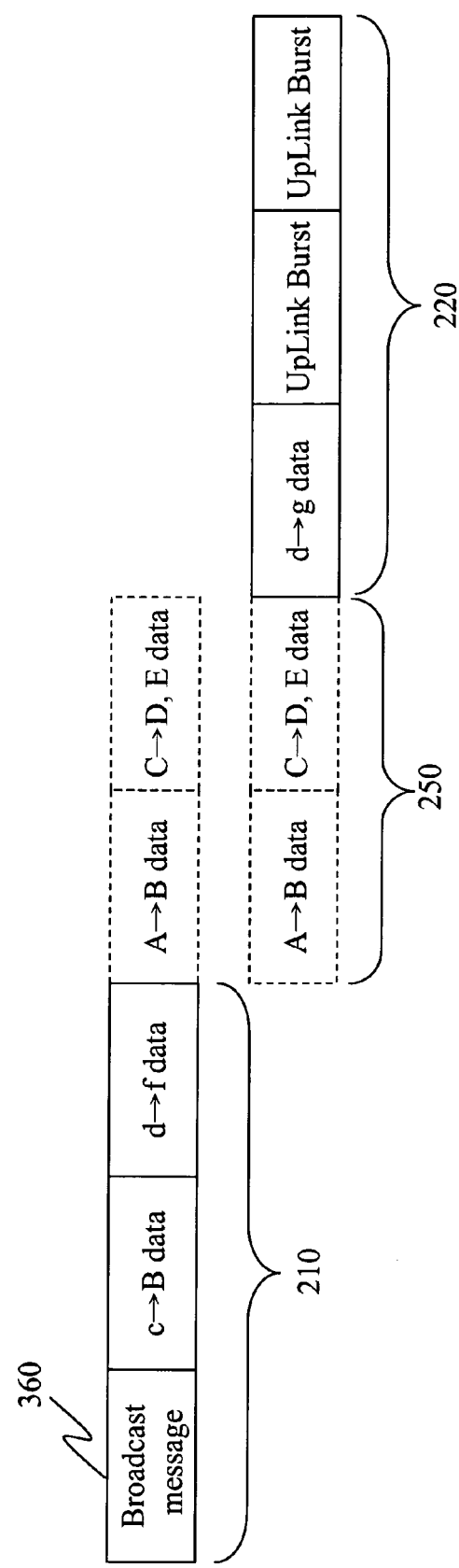
FIG. 5b is a schematic diagram of a scheduling architecture of a frame disclosed in an embodiment of the present invention.

Finally, the BS 110 may add the time slot information allocated in the scheduling and an initial transmit power value required by the transmitting SS into the broadcast message 360 sent to each SS 120, 130 (Step 450); as shown in FIG. 5b, the SS A may obtain the initial transmit power value required for transmitting to the SS B after receiving the broadcast message 360 sent by the BS 110, and transmit the "A→B data" to the SS B in the first time slot of the DirectLink SubFrame 250, and the SS B also receives the "A→B data" in the first time slot of the DirectLink SubFrame 250 according to the scheduling information in the broadcast message 360.

Similarly, the SS C may obtain an initial transmit power value required for emitting over a longer distance when transmitting to the SSs D, E after receiving the broadcast message 360 sent by the BS 110, and transmits the "C→D, E data" to the SSs D, E in the second time slot of the DirectLink SubFrame 250, and the SSs D, E also receive the "C→D, E data" in the second time slot of the DirectLink SubFrame 250 respectively, according to the scheduling information in the broadcast message 360.

Figure 4B:
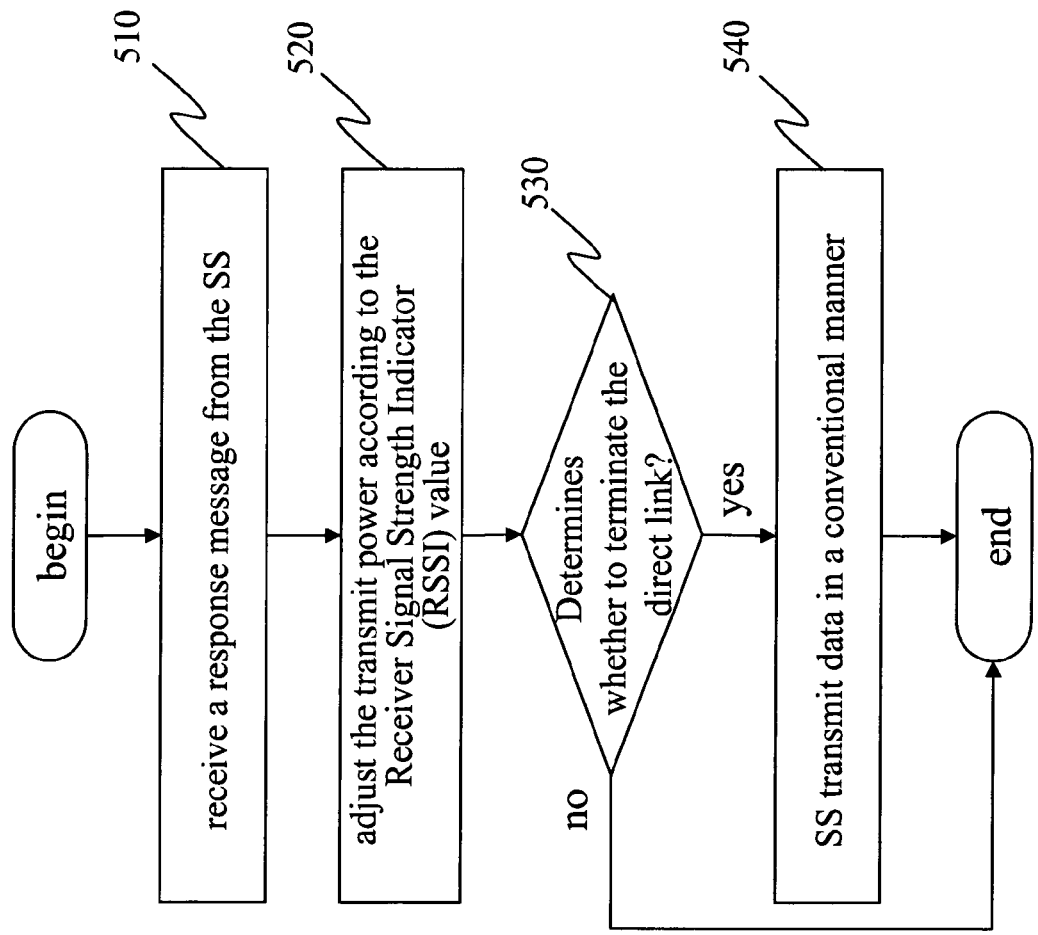
FIG. 4b is a flow chart for terminating the direct link according to the present invention.

Referring to FIG. 4b, the receiving SS will transmit a response message of the data transmission result to the BS 110 (Step 510) after receiving a single data, for example, a receiver signal strength indicator (RSSI) value, a bit error rate (BER), a packet error rate (PER), and other types of response messages. When any one of the response messages received from the receiving SS is lower than a respective predetermined threshold, the BS 110 alters a modulation mode or a channel coding mode of the two SSs 120, 130, and then carries out the try and error many times (Step 520) and determines whether to terminate the direct link 170 (Step 530).

If it is determined that the transmission still fails after many adjustments, for example, the RSSI is always lower than the predetermined first threshold, the BER is always higher than the predetermined second threshold, the PER is always higher than the predetermined third threshold, or the adjusted transmit power of the transmitting SS has exceeded a maximum transmit power of the transmitting SS, the two SSs 120, 130 which were previously determined to be able to carry out the direct link 170 cannot transmit data in the manner of direct link 170, and must still transmit or receive data in a conventional manner (Step 540).

Comparing FIG. 2a of the conventional manner with FIG. 5a of the present invention, it can be discovered that although in a scheduling of the BS 110, a frame 20 is averagely divided into 8 time slots including a broadcast message 160, the BS 110 may perform data transmission service for 7 SSs simultaneously in the conventional manner, while for FIG. 5a of the present invention, the BS 110 may serve 10 SSs simultaneously. For a further comparison, supposing a BS 110 may divide a frame 20 into n time slots in the conventional manner, it may perform data transmission service for n−1 SSs in n−1 time slots in a most preferred case, except a time slot used as the broadcast message 160, while through the present invention, it may serve 2(n−1) SSs in n time slots in the most preferred case, which is two times that of the conventional manner, such that the service efficiency of the BS 110 is increased indeed.

Through the scheduling mechanism of the BS disclosed in the present invention, without any need to change the specification of the SS, the BS of the present invention may accept connection requests from more SSs simultaneously, raising the overall service efficiency of wireless resources, shortening the transmission time of each SS, and further reducing distribution density of the BS, thereby cutting down the operating cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for direct link in a wireless communication system, applied in a base station (BS) with functions for broadcast and time division duplex (TDD), the method comprising the following steps:

receiving a plurality of connection request signalings including a position information from a plurality of subscriber stations (SSs) with a positioning device under control;

determining whether there is at least one set of a plurality of SSs which can carry out the direct link, according to each connection request signaling, wherein each set includes a transmitting SS and at least one receiving SS;

allocating a plurality of time slots to each set of SSs which may carry out the direct link in a scheduling;

calculating a relative distance between the two according to each piece of position information in the set;

determining an initial transmit power of the transmitting SS according to the relative distance; and adding the initial transmit power of the transmitting SS and a time slot information allocated to each set of SSs in the scheduling into a broadcast message.

2. The method for direct link in a wireless communication system as claimed in claim 1, wherein when the set comprises more than one receiving SS, the transmitting SS transmits by a transmit power corresponding to the longer relative distance.

3. The method for direct link in a wireless communication system as claimed in claim 1, wherein each receiving SS should transmit a response message to the BS, for responding whether or not the transmitting SS is transmitting successfully.

4. The method for direct link in a wireless communication system as claimed in claim 3, wherein the response message is any combination of a receiver signal strength indicator (RSSI) value, a bit error rate (BER), and a packet error rate (PER) value of the receiving Ss.

5. The method for direct link in a wireless communication system as claimed in claim 4, wherein the RSSI value less than a predetermined first threshold indicates a receiving failure and is written in the response message.

6. The method for direct link in a wireless communication system as claimed in claim 5, wherein when the BS receives the response message of receiving failure, a transmit power of the transmitting SS is adjusted according to the RSSI value.

7. The method for direct link in a wireless communication system as claimed in claim 6, wherein when the BS receives the response message of receiving failure, a modulation mode of the two SSs is altered.

8. The method for direct link in a wireless communication system as claimed in claim 6, wherein when the BS receives the response message of receiving failure, a channel coding mode of the two SSs is altered.

9. The method for direct link in a wireless communication system as claimed in claim 6, wherein when the transmit power has exceeded a maximum transmit power of the transmitting SS, the transmission manner of direct link is stopped.

10. The method for direct link in a wireless communication system as claimed in claim 4, wherein the BER larger than a predetermined second threshold indicates a receiving failure.

11. The method for direct link in a wireless communication system as claimed in claim 10, wherein when the BS receives the response message of receiving failure, a transmit power of the transmitting SS is adjusted according to the BER.

12. The method for direct link in a wireless communication system as claimed in claim 11, wherein when the BS receives the response message of receiving failure, a modulation mode of the two SSs is altered.

13. The method for direct link in a wireless communication system as claimed in claim 11, wherein when the BS receives the response message of receiving failure, a channel coding mode of the two SSs is altered.

14. The method for direct link in a wireless communication system as claimed in claim 11, wherein when the transmit power has exceeded a maximum transmit power of the transmitting SS, the transmission manner of direct link is stopped.

15. The method for direct link in a wireless communication system as claimed in claim 4, wherein the PER larger than a predetermined third threshold indicates a receiving failure.

16. The method for direct link in a wireless communication system as claimed in claim 15, wherein when the BS receives the response message of receiving failure, a transmit power of the transmitting SS is adjusted according to the PER.

17. The method for direct link in a wireless communication system as claimed in claim 16, wherein when the BS receives the response message of receiving failure, a modulation mode of the two SSs is adjusted.

18. The method for direct link in a wireless communication system as claimed in claim 16, wherein when the BS receives the response message of receiving failure, a channel coding mode of the two SSs is altered.

19. The method for direct link in a wireless communication system as claimed in claim 16, wherein when the transmit power has exceeded a maximum transmit power of the transmitting SS, the transmission manner of direct link is stopped.

20. The method for direct link in a wireless communication system as claimed in claim 1, wherein the scheduling comprises an UpLink SubFrame, a DownLink SubFrame, and a DirectLink SubFrame.

21. The method for direct link in a wireless communication system as claimed in claim 20, wherein in the DirectLink SubFrame, each UpLink Burst corresponds to at least one DownLink Burst.

22. The method for direct link in a wireless communication system as claimed in claim 1, wherein the positioning device is a global positioning system (GPS).

23. The method for direct link in a wireless communication system as claimed in claim 1, wherein the determining step with conditions comprise a relative distance of the set of SSs.

24. The method for direct link in a wireless communication system as claimed in claim 23, wherein if the relative distance is too long, the data is transmitted between the two SSs in a conventional transmission manner in which the BS is used for forwarding data.

* * * * *